(12) United States Patent
Watanabe et al.

(10) Patent No.: US 8,872,444 B2
(45) Date of Patent: Oct. 28, 2014

(54) LIGHTING DEVICE FOR SOLID-STATE LIGHT SOURCE AND ILLUMINATION APPARATUS INCLUDING SAME

(75) Inventors: Koji Watanabe, Kyoto (JP); Kazuhiro Nisimoto, Hyogo (JP); Hiromitsu Mizukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 118 days.

(21) Appl. No.: 13/446,257

(22) Filed: Apr. 13, 2012

(65) Prior Publication Data

US 2012/0262087 A1 Oct. 18, 2012

(30) Foreign Application Priority Data

Apr. 13, 2011 (JP) ................................. 2011-089593

(51) Int. Cl.
*H05B 37/02* (2006.01)
*H05B 33/08* (2006.01)

(52) U.S. Cl.
CPC ........... *H05B 33/0815* (2013.01); *Y02B 20/347* (2013.01)
USPC ........... 315/307; 315/224; 315/294; 315/297; 315/308

(58) Field of Classification Search
USPC ............. 315/194, 209 R, 246, 291, 299, 302, 315/307, 308, 297, 294, 224
See application file for complete search history.

(56) References Cited

U.S. PATENT DOCUMENTS

| | | | |
|---|---|---|---|
| 2009/0243582 A1* | 10/2009 | Irissou et al. | ................. 323/320 |
| 2010/0110593 A1 | 5/2010 | Kim et al. | |
| 2010/0141158 A1* | 6/2010 | Newman et al. | ............... 315/182 |
| 2011/0193495 A1* | 8/2011 | Mishima et al. | ............... 315/307 |

FOREIGN PATENT DOCUMENTS

| | | |
|---|---|---|
| EP | 2341760 A | 7/2011 |
| JP | 2010-40878 | 2/2010 |
| WO | 2004/107546 A | 12/2004 |
| WO | 2007/141741 A | 12/2007 |

OTHER PUBLICATIONS

European Search Report dated Apr. 10, 2014, for application No. EP 12162536.2.

* cited by examiner

*Primary Examiner* — Thienvu Tran
*Assistant Examiner* — Christopher Lo
(74) *Attorney, Agent, or Firm* — Bacon & Thomas, PLLC

(57) ABSTRACT

A lighting device for a solid-state light source includes a DC power source circuit section which flows a current in a solid-state light source by using a charging/discharging current or either one of charging and discharging currents of a inductor connected in series to a switching element, and a current control section having a first switching control unit for changing an ON width of the switching element depending on a dimming level and a second switching control unit for controlling an ON timing of the switching element. The second switching control unit changes a time until the switching element is turned on from a zero-crossing of the discharging current of the inductor such that the time becomes substantially the same when the dimming level is equal to or greater than a predetermined level, and the time becomes longer when the dimming level is less than the predetermined level.

6 Claims, 8 Drawing Sheets

US 8,872,444 B2

LIGHTING DEVICE FOR SOLID-STATE LIGHT SOURCE AND ILLUMINATION APPARATUS INCLUDING SAME

FIELD OF THE INVENTION

The present invention relates to a lighting device for turning on a solid-state light source such as a light emitting diode (LED) and an illumination apparatus including same.

BACKGROUND OF THE INVENTION

Japanese Patent Application Publication No. 2010-40878 (FIGS. 1 and 2, Paragraphs 35 and 40) discloses an LED lighting device for controlling a current flowing through a light emitting diode (LED) by a step-down chopper circuit operating in a so-called boundary mode. Here, the boundary mode is a control mode in which, as shown in FIG. 10, an energy accumulated in an inductance element during an ON period $T_{ON}$ of a switching element is discharged during an OFF period $T_{OFF}$ of the switching element, and the switching element is turned on again at a timing when the energy is completely discharged. The boundary mode has high power conversion efficiency compared to other control modes. Further, since half of a peak value of a switching current is an effective value of a load current, a constant current control can be easily realized.

For example, a case where a switching element Q1 of a step-down chopper circuit 1a as shown in FIG. 8A is operated in the boundary mode will now be described. Supplied between input terminals A and B is a direct current (DC) voltage obtained by boosting a voltage from, e.g., a commercial alternating current (AC) power source via a step-up chopper circuit. Connected between output terminals C and D is an LED series circuit or a load circuit including a plurality of LED series circuits connected in parallel. When the switching element Q1 is turned on, a current $I_{Q1}$ shown in FIG. 10 flows through the switching element Q1→an inductor L1→a capacitor C2 to accumulate energy in the inductor L1. When the switching element Q1 is turned off, a counter electromotive force is generated by the energy accumulated in the inductor L1, and a flyback current $I_{D1}$ flows through a path including the inductor L1→the capacitor C2→a diode D1. When the switching element Q1 is turned on again at a timing when the flyback current $I_{D1}$ returns to zero, the power conversion efficiency is higher compared to other control modes since a switching loss is small and a pause period of the current does not occur.

In Paragraphs 35 and 40 of Japanese Patent Application Publication No. 2010-40878, there has been proposed a technique for PWM controlling the ON period $T_{ON}$ of the switching element Q1 in the step-down chopper circuit 1a based on an external dimming signal. However, as can be seen from an operation waveform shown in FIG. 10, in case of narrowing the ON period $T_{ON}$ of the switching element Q1, in conjunction therewith, an OFF period of the switching element Q1 is also narrowed. Consequently, an operating frequency of the switching element Q1 increases, and thus, the number of switching times increases, thereby resulting in an increase in the switching loss. Further, in case of expanding a range of the operating frequency, it makes it difficult to design a filter circuit for removing a switching noise.

SUMMARY OF THE INVENTION

In view of the above, the present invention provides a lighting device for a solid-state light source capable of limiting a range of a switching operating frequency even when a dimming operation is performed in a wide range.

In accordance with an embodiment of the present invention, there is provided a lighting device for a solid-state light source, including: a DC power source circuit section which performs power conversion of a power of a DC input power source by using an inductor connected in series to a switching element, and flows a current in a solid-state light source by using a charging/discharging current or either one of charging and discharging currents of the inductor; and a current control section which controls the switching element to control a current flowing through the solid-state light source for controlling a dimming level of the solid-state light source. The current control section includes a first switching control unit for changing an ON width of the switching element depending on the dimming level; and a second switching control unit for controlling an ON timing of the switching element. Further, the second switching control unit changes a time until the switching element is turned on from a zero-crossing of the discharging current of the inductor such that the time becomes substantially the same when the dimming level is equal to or greater than a predetermined level, and the time becomes longer when the dimming level is less than the predetermined level.

Further, it is preferable that while the first switching control unit changes the ON width of the switching element to be reduced as the dimming level is reduced, the second switching control unit changes the time until the switching element is turned on from the zero-crossing of the discharging current of the inductor such that the time becomes substantially the same when the dimming level is equal to or greater than the predetermined level, and the time becomes longer by making an on/off frequency of the switching element substantially the same as a frequency at the predetermined level when the dimming level is less than the predetermined level.

Further, it is preferable that while the first switching control unit changes the ON width of the switching element to be reduced as the dimming level is reduced when the dimming level is equal to or greater than the predetermined level and controls the ON width of the switching element to be substantially the same as an ON width at the predetermined level when the dimming level is less than the predetermined level, the second switching control unit changes the time until the switching element is turned on from the zero-crossing of the discharging current of the inductor such that the time becomes substantially the same when the dimming level is equal to or greater than the predetermined level, and the time becomes longer by making an on/off frequency of the switching element decrease from a frequency at the predetermined level when the dimming level is less than the predetermined level.

Further, it is preferable that while the first switching control unit changes the ON width of the switching element to be reduced as the dimming level is reduced, the second switching control unit changes the time until the switching element is turned on from the zero-crossing of the discharging current of the inductor such that the time becomes substantially the same when the dimming level is equal to or greater than the predetermined level, and the time becomes longer by making an on/off frequency of the switching element substantially the same as a frequency at the predetermined level when the dimming level is less than the predetermined level, and if the dimming level becomes less than an additional predetermined level with a light flux lower than the predetermined level, while the first switching control unit controls the ON width of the switching element to be substantially the same as an ON width at the additional predetermined level, the second switching control unit changes the time until the switching element is turned on from the zero-crossing of the discharging current of the inductor such that the time becomes longer by making an on/off frequency of the switching element decrease from a frequency at the second predetermined level.

Further, it is preferable that the second switching control unit controls the time until the switching element is turned on from the zero-crossing of the discharging current of the inductor to be almost zero when the dimming level is equal to or greater than the predetermined level.

In accordance with another embodiment of the present invention, there is provided an illumination apparatus including the lighting device for the solid-state light source described above.

In accordance with the present invention, the lighting device for the solid-state light source using a switching power source includes the first switching control unit to change the ON width of the switching element, and the second switching control unit to control the ON timing of the switching element. The second switching control unit changes the time until the switching element is turned on from the zero-crossing of the discharging current of the inductor such that the time becomes substantially the same when the dimming level is equal to or greater than the predetermined level, and the time becomes longer when the dimming level is less than the predetermined level. Thus, there is an effect of limiting a range of a switching operating frequency even when the dimming operation is performed in a wide range.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS (First Embodiment)

Figure 1:
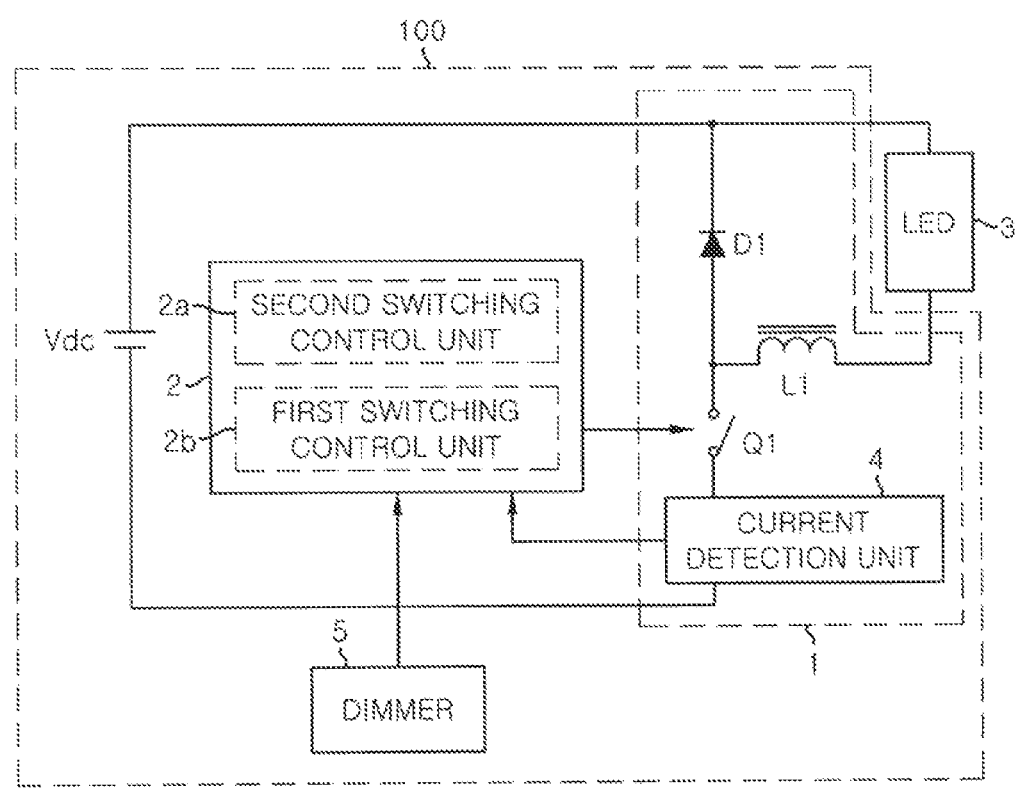
FIG. 1 is a circuit diagram showing a schematic configuration of a lighting device for a solid-state light source in accordance with a first embodiment of the present invention.

FIG. 1 is a circuit diagram of a lighting device for a solid-state light source in accordance with a first embodiment of the present invention. The lighting device 100 in this embodiment includes a DC input power source Vdc; a DC power source circuit section 1 having a flyback diode D1, an inductor L1, a switching element Q1 and a current detection unit 4; a current control section 2 having first and second switching control units 2a and 2b; and a dimmer 5. The DC power source circuit section 1 is connected to the DC input power source Vdc. The DC power source circuit section 1 serves as a switching power source circuit which performs power conversion of a power of the DC input power source Vdc by using the switching element and supplies a DC current to a solid-state light source 3 such as a light emitting diode (LED) or an organic light emitting diode (OLED). In this case, a step-down chopper circuit (back converter) is employed as the DC power source circuit section 1.

The step-down chopper circuit is configured such that a series circuit of the solid-state light source 3, the inductor L1, the switching element Q1 and the current detection unit 4 is connected between a positive and a negative electrode of the DC input power source Vdc, and the flyback diode D1 is connected in parallel to a series circuit of the solid-state light source 3 and the inductor L1 to form a closed circuit.

The step-down chopper circuit is operated such that when the switching element Q1 is turned on, a gradually increasing current flows through a path including the positive electrode of the DC input power source Vdc→the solid-state light source 3→the inductor L1→the switching element Q1→the current detection unit 4→the negative electrode of the DC input power source Vdc to accumulate energy in the inductor L1. When the switching element Q1 is turned off, a voltage induced in the inductor L1 causes a gradually decreasing current to flow through a path including the inductor L1→the flyback diode D1→the solid-state light source 3→the inductor L1 to discharge the energy of the inductor L1.

An operation in which the switching element Q1 is turned on before the energy of the inductor L1 has been completely discharged is referred to as a continuous mode. An operation in which the switching element Q1 is turned on at a timing when the energy of the inductor L1 is completely discharged is referred to as a boundary mode. An operation in which the switching element Q1 is turned on subsequent to a pause period after the energy of the inductor L1 has been completely discharged is referred to as a discontinuous mode. Among these modes, the boundary mode has the highest power conversion efficiency.

The switching element Q1 is turned on and off at a high frequency by a current control section 2. When the switching element Q1 is in an ON state, the gradually increasing current flowing through the switching element Q1 is detected by the current detection unit 4. A current detection value detected by the current detection unit 4 is compared with a predetermined threshold set up by the current control section 2. When the current detection value reaches the predetermined threshold, the switching element Q1 is turned off. Accordingly, a peak value of the current flowing through the switching element Q1 is set to the predetermined threshold.

Figure 2:
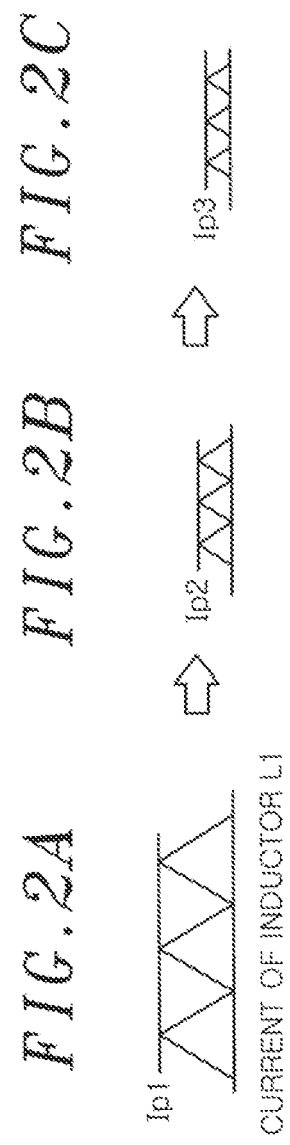
FIGS. 2A to 2C show operation waveforms of the lighting device for the solid-state light source.
Figure 10:
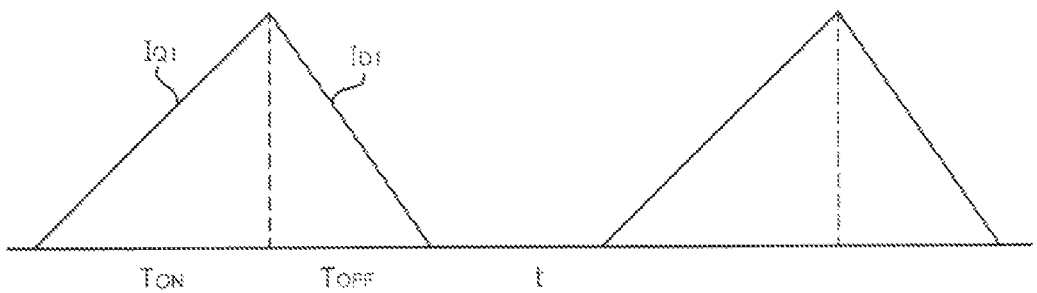
FIG. 10 shows an operation waveform of a lighting device for a solid-state light source in accordance with a conventional case.

FIGS. 2A to 2C illustrate waveforms of the current flowing through the inductor L1 by the on/off operation of the switching element Q1. While the current flowing through the inductor L1 is gradually increased, the current flowing through the inductor L1 is the same as the current flowing through the switching element Q1, and while the current flowing through the inductor L1 is gradually decreasing, the current flowing through the inductor L1 is the same as the current flowing through the flyback diode D1 (see FIG. 10).

FIG. 2A shows the waveform of the current flowing through the inductor L1 when a predetermined threshold Ip1 set up by the current control section 2 is high, and FIG. 2B shows the waveform when a predetermined threshold Ip2 is low. The predetermined thresholds Ip1 and Ip2 are set up by the current control section 2 based on a dimming signal supplied to the current control section 2 from a dimmer 5. FIGS. 2A and 2B shown the waveforms in a case where the current flowing through the inductor L1 is in the boundary mode, but the current flowing through the inductor L1 may be in the continuous mode.

FIG. 2C shows the waveform when a predetermined threshold Ip3 set by the current control section 2 is even lower. In case of the waveform shown in FIG. 2C, the current flowing through the inductor L1 is in the discontinuous mode.

The current control section 2 reads the dimming signal supplied from the dimmer 5, and controls the first switching control unit 2a to set the peak value of the current flowing through the switching element Q1 as shown in FIGS. 2A and 2B and vary an ON-time width of the switching element Q1. Further, the current control section 2 controls the second switching control unit 2b to control an ON timing of the switching element Q1 such that the current flowing through the inductor L1 is in the discontinuous mode as shown in FIG. 2C if a dimming level is less than a predetermined value, and the current flowing through the inductor L1 is in the continuous mode or boundary mode as shown in FIGS. 2A and 2B if a dimming level is equal to or greater than a predetermined value. Thus, a high frequency on/off operation of the switching element Q1 is controlled. Accordingly, even when a dimming operation is performed in a wide range, it is possible to suppress the expansion of a range of the operating frequency of the switching element Q1.

(Second Embodiment)

Figure 3:
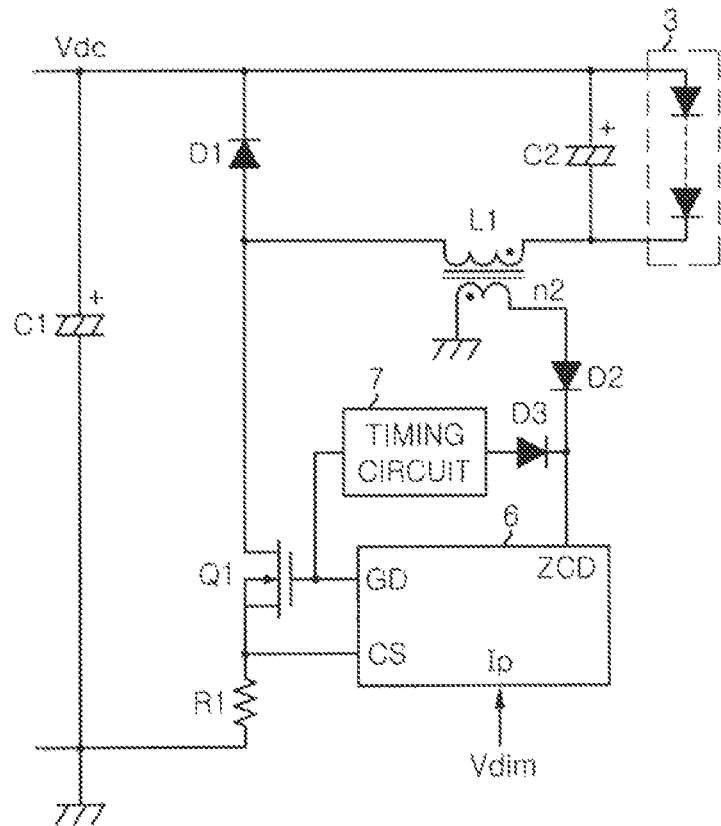
FIG. 3 is a circuit diagram of a lighting device for a solid-state light source in accordance with a second embodiment of the present invention.

FIG. 3 is a circuit diagram of a lighting device for a solid-state light source in accordance with a second embodiment of the present invention. In this embodiment, in order to perform the on/off control of the switching element Q1, there is provided a control integrated circuit 6 having an OFF control function using peak current detection and an ON control function using zero-cross detection. As this type of the control integrated circuit 6, a power factor correction control integrated circuit (IC) of a step-up chopper circuit (e.g., L6562 manufactured by STMicroelectronics, Inc., or its compatible) may be used.

A gate drive terminal GD outputs a gate drive signal of high/low level for controlling the on/off of the switching element Q1. A current sense terminal CS detects a voltage across a current detection resistor R1 connected in series to the switching element Q1, and compares the detected voltage with a predetermined threshold by using an internal comparator. The predetermined threshold may be set by a dimming voltage Vdim externally inputted to a peak current setting terminal Ip. A zero-cross detection terminal ZCD is a terminal for controlling the switching element Q1 to be turned on when it is detected that a voltage of a secondary winding n2 of the inductor L1 disappears after the switching element Q1 is turned off. The illustration of a control power source terminal Vcc and a ground terminal GND has been omitted.

Further, as described above, in case of using the power factor correction control IC of a step-up chopper circuit as the control integrated circuit 6, preferably, a terminal (a third pin in case of L6562) used to detect an instantaneous amplitude of a ripple voltage may be assigned as the peak current setting terminal Ip.

In this embodiment, a timer circuit 7 and a diode D3 are connected between the gate drive terminal GD and the zero-cross detection terminal ZCD. Further, a diode D2 is connected between the secondary winding n2 of the inductor L1 and the zero-cross detection terminal ZCD, and a cathode of each of the diodes D2 and D3 is connected to the zero-cross detection terminal ZCD. The diodes D3 and D2 form a diode OR circuit such that the voltage of the zero-cross detection terminal ZCD drops at a later one of a timing at which the output of the timer circuit 7 disappears and a timing at which the voltage of the secondary winding n2 disappears.

When the timing at which the voltage of the secondary winding n2 disappears is the later one, it leads to an operation in the boundary mode as shown in FIGS. 2A and 2B. When the timing at which the output of the timer circuit 7 disappears is the later one, it leads to an operation in the discontinuous mode as shown in FIG. 2C.

First, the operation in the boundary mode as shown in FIGS. 2A and 2B will now be described. In the following explanation about this operation, after the switching element Q1 is turned off, the output of the timer circuit 7 first disappears, and then the voltage of the secondary winding n2 disappears.

After power is supplied, when the operation of the control integrated circuit 6 is started, the gate drive terminal GD becomes a high level by a built-in starter, and the switching element Q1 is turned on. Then, a gradually increasing current flows through a path including a positive electrode of a capacitor C1→a capacitor C2→the inductor L1→the switching element Q1→the current detection resistor R1→a negative electrode of the capacitor C1. When a current detection value detected by using the current detection resistor R1 reaches a predetermined threshold, an internal flip-flop of the IC is inverted, and the gate drive terminal GD becomes a low level. Accordingly, the switching element Q1 is turned off.

When the switching element Q1 is turned off, by the energy accumulated in the inductor L1, a flyback current flows through a path including the inductor L1→the flyback diode D1→the capacitor C2→inductor L1. While the flyback current flows, in the secondary winding n2 of the inductor L1, a voltage is generated in a forward direction of the diode D2. When the voltage thus generated disappears, it is detected that the voltage of the zero-cross detection terminal ZCD drops, so that the internal flip-flop of the IC is inverted, and the gate drive terminal GD becomes a high level. Accordingly, the switching element Q1 is turned on.

Then, the same operation is repeated, and the current flowing through the inductor L1 is in the boundary mode as shown in FIGS. 2A and 2B. Further, the peak values Ip1 and Ip2 of the current flowing through the inductor L1 are values set by the dimming voltage Vdim externally inputted to the peak current setting terminal Ip.

Next, the operation in the discontinuous mode as shown in FIG. 2C will now be described. When the dimming voltage Vdim externally inputted to the peak current setting terminal Ip is lowered and the peak value of the current flowing through the inductor L1 is lowered, the timing at which the voltage of the secondary winding n2 disappears becomes earlier since the accumulated energy in the inductor L1 becomes smaller. On the other hand, the counting time of the timer circuit 7 is constant and, therefore, the output of the timer circuit 7 disappears after a predetermined time from the rise or drop of a gate voltage of the switching element Q1.

Accordingly, when the peak value of the current flowing through the inductor L1 is lowered similarly to the value Ip3 shown in FIG. 2C, the flyback voltage of the secondary winding n2 first disappears, and then the output of the timer circuit 7 disappears. In this case, even if the flyback current of the inductor L1 disappears, the output of the timer circuit 7 through the diode D3 is detected as a quasi-flyback voltage. Accordingly, the control integrated circuit 6 does not detect the zero-crossing, so that the switching element Q1 remains in an OFF state. Then, the voltage of the zero-cross detection terminal ZCD drops from the timing at which the output of the timer circuit 7 through the diode D3 disappears. Accordingly, the control integrated circuit 6 determines that the flyback voltage has disappeared, and the switching element Q1 is turned on. Thus, the current flowing through the inductor L1 is in the discontinuous mode having a pause period as shown in FIG. 2C.

Suppose that when the peak value of the current flowing through the inductor L1 is the peak value Ip2 as in FIG. 2B, the dimming level is equal to a predetermined dimming value causing switching between the boundary mode and the discontinuous mode. As shown FIGS. 2A and 2B, if the peak value of the current flowing through the inductor L1 is between the value Ip1 and the value Ip2, the switching element Q1 is turned on at a timing at which a signal of the secondary winding n2 through the diode D2 disappears, thereby performing the operation in the boundary mode. As shown FIGS. 2B and 2C, if the peak value of the current flowing through the inductor L1 is between the value Ip2 and the value Ip3 and between the value Ip3 and zero, the switching element Q1 is turned on at a timing at which a signal of the timer circuit 7 through the diode D3 disappears, thereby performing the operation in the discontinuous mode.

Figure 4:
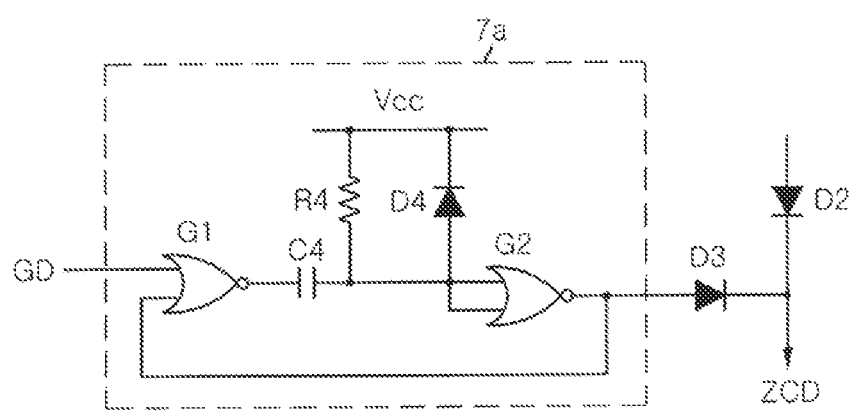
FIG. 4 is a circuit diagram of a main part of the lighting device for the solid-state light source in accordance with the second embodiment of the present invention.

The specific configuration of the timer circuit 7 is not limited to the present embodiment. For example, if the timer circuit is configured as shown in FIG. 4, it is operated such that an output of a timer circuit 7a becomes a high level at a rising edge of the gate voltage of the switching element Q1, and the output of the timer circuit 7a becomes a low level after a predetermined time from the rising edge. In this case, the shortest on/off period of the switching element Q1 (i.e., an upper limit of the operating frequency) is defined by the timer circuit 7a.

Hereinafter, the operation of the timer circuit 7a will now be described. When the gate drive terminal GD is changed from a low level to a high level, an output of a NOR gate G1 becomes a low level and, thus, an input of the NOR gate G2 also becomes a low level via a capacitor C4, and an output of the NOR gate G2 becomes a high level. Accordingly, the other input of the NOR gate G1 also becomes a high level, so that even if the gate drive terminal GD becomes a low level afterwards, the output of the NOR gate G1 remains at the low level. In this state, the capacitor C4 is charged from the control power source voltage Vcc via a resistor R4. When a voltage of the capacitor C4 reaches a threshold voltage (typically Vcc/2) of the NOR gate G2, the output of the NOR gate G2 becomes a low level.

At this time, if the gate drive terminal GD already has a low level, the output of the NOR gate G1 becomes a high level, so that electric charges of the capacitor C4 can be discharged via a diode D4 to prepare for the next counting operation.

Further, even if the ON time of the switching element Q1 is long and the gate drive terminal GD has not returned to the low level when the output of the NOR gate G2 returns to the low level, the trigger does not occur again since the capacitor C4 has not been reset at that time.

Then, at the time when the gate drive terminal GD returns to the low level, the output of the NOR gate G1 becomes a high level, and the capacitor C4 is reset via the diode D4. Since the output of the NOR gate G2 is not changed even at the time of the reset, an output pulse of the timer circuit 7a is generated only once after the gate drive terminal GD is changed from the low level to the high level.

As described above, the output of the NOR gate G2 becomes a high level until a delay time determined by a time constant of the resistor R4 and the capacitor C4 and a threshold voltage of the NOR gate G2 has elapsed after the gate drive terminal GD is changed from low level to high level. Accordingly, the shortest on/off period of the switching element Q1 (i.e., an upper limit of the operating frequency) is defined.

In accordance with this embodiment, since the upper limit of the operating frequency of the switching element Q1 is fixed to a maximum switching frequency defined by the timer circuit 7a, a filter circuit for removing switching noise can be easily designed.

Further, when a dimming output is large (bright), as shown in FIG. 2A, the number of switching times of the switching element Q1 is small, and the operation is performed in the boundary mode, thereby suppressing a switching loss to be extremely low.

In addition, when a dimming output is small (dark), as shown in FIG. 2C, by providing a pause period in the current of the inductor L1, it is possible to prevent the number of switching times of the switching element Q1 from increasing indefinitely, thereby suppressing an increase in switching loss. Further, since the pause period of the current of the inductor L1 becomes longer as the peak value Ip3 is lowered, there is an advantage of comparatively reducing a lower limit of dimming even though a controllable range of the lower limit of the peak value Ip3 is limited.

(Third Embodiment)

Figure 5:
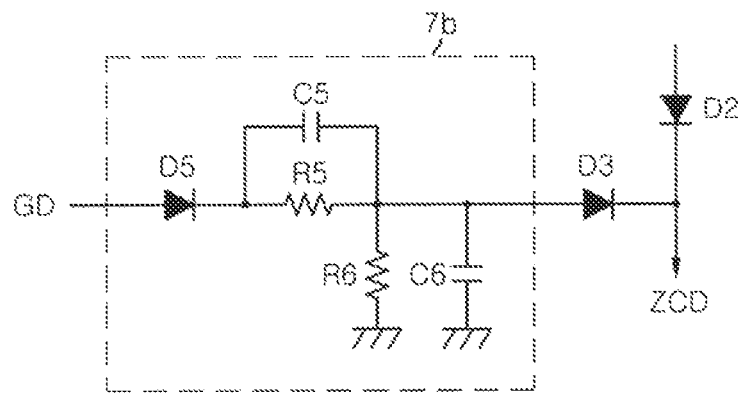
FIG. 5 is a circuit diagram of a main part of a lighting device for a solid-state light source in accordance with a third embodiment of the present invention.

FIG. 5 is a circuit diagram of a main part of a lighting device for a solid-state light source in accordance with a third embodiment of the present invention. In this embodiment, a timer circuit 7b shown in FIG. 5 is used as the timer circuit 7 shown in FIG. 3. The timer circuit 7b shown in FIG. 5 is operated such that its output is reduced to the zero-cross detection level of the zero-cross detection terminal ZCD after a predetermined time from a falling edge (OFF time point) of the gate voltage rather than a rising edge (ON time point) of the gate voltage of the switching element Q1. Accordingly, in this embodiment, the shortest OFF time of the switching element Q1 is defined by the timer circuit 7b.

The timer circuit 7b includes a series circuit of capacitors C5 and C6, resistors R5 and R6 respectively connected in parallel to the capacitors C5 and C6, and a diode D5 through which a charge current flows in the series circuit of capacitors C5 and C6. A voltage of the capacitor C6 is inputted to the zero-cross detection terminal ZCD of the control integrated circuit 6 through the anode and cathode of the diode D3.

During the ON period of the switching element Q1, since the gate drive terminal GD of the control integrated circuit 6 becomes a high level, the series circuit of capacitors C5 and C6 is charged via the diode D5. The charging voltage is determined transiently by a voltage dividing ratio between the capacitors C5 and C6 and determined regularly by a voltage dividing ratio between the resistors R5 and R6. However, in this case, the voltage dividing ratio between the capacitors C5 and C6 is equal to the voltage dividing ratio between the resistors R5 and R6. Then, at a moment when the switching element Q1 is turned on, the charging voltage of the capacitor C6 becomes an initial setting voltage k×Vg obtained by dividing a gate drive voltage Vg of the gate drive terminal GD at a predetermined voltage dividing ratio k (0<k<1), and maintains the initial setting voltage until the switching element Q1 is turned off.

When the switching element Q1 is turned off, the diode D5 is reverse biased to be in a cut-off state, so that electric charges of the capacitor C5 are discharged via the resistor R5, and electric charges of the capacitor C6 are discharged via the resistor R6. The voltage of the capacitor C6 becomes a voltage which decreases exponentially with a time constant of the resistor R6 and the capacitor C6 using the initial setting voltage k×Vg as a starting point.

After the switching element Q1 is turned off, if the voltage of the secondary winding n2 through the diode D2 has already disappeared at the time when a predetermined OFF time has elapsed, the voltage of the capacitor C6 through the diode D3 disappears, and the zero-cross is detected as a quasi-zero-cross by the zero-cross detection terminal ZCD, so that the switching element Q1 is turned on again.

Therefore, in a case where the timer circuit 7b is used as the timer circuit 7 shown in FIG. 3, the shortest OFF time of the switching element Q1 is a fixed time determined by a time constant of the resistors R5 and R6 and the capacitors C5 and C6.

Even after it is switched to the discontinuous mode as shown in FIG. 2C, the ON time decreases as the peak value Ip3 is lowered, and the operating frequency of the on/off of the switching element Q1 continues to rise. However, in accordance with this embodiment, since the OFF time of the switching element Q1 is fixed by the timer circuit 7b, the increase in operating frequency can be slow. Finally, even if the ON time of the switching element Q1 has become almost zero, a switching period is not shorter than the OFF time of the switching element Q1 and, therefore, the operating frequency will not rise indefinitely. Accordingly, since a range of the switching frequency is limited, a filter circuit for removing switching noise can be easily designed. In addition, the increase in switching loss can also be suppressed.

Meanwhile, the threshold Ip for detection of the peak current of the control integrated circuit 6 is set to be variable in the second and third embodiments, but it may also be a fixed value. In that case, it may be configured such that the bias voltage corresponding to the dimming voltage Vdim is superimposed on the detection voltage of the current detection resistor R1 connected in series to the switching element Q1, or the resistance value of the current detection resistor R1 is set to be variable depending on the dimming voltage Vdim so that the operation is equivalent to the case of setting the threshold Ip to be variable. In addition, instead of the current detection resistor R1, an alternative may be used as described in the following a fourth and fifth embodiments.

(Fourth Embodiment)

Figure 6:
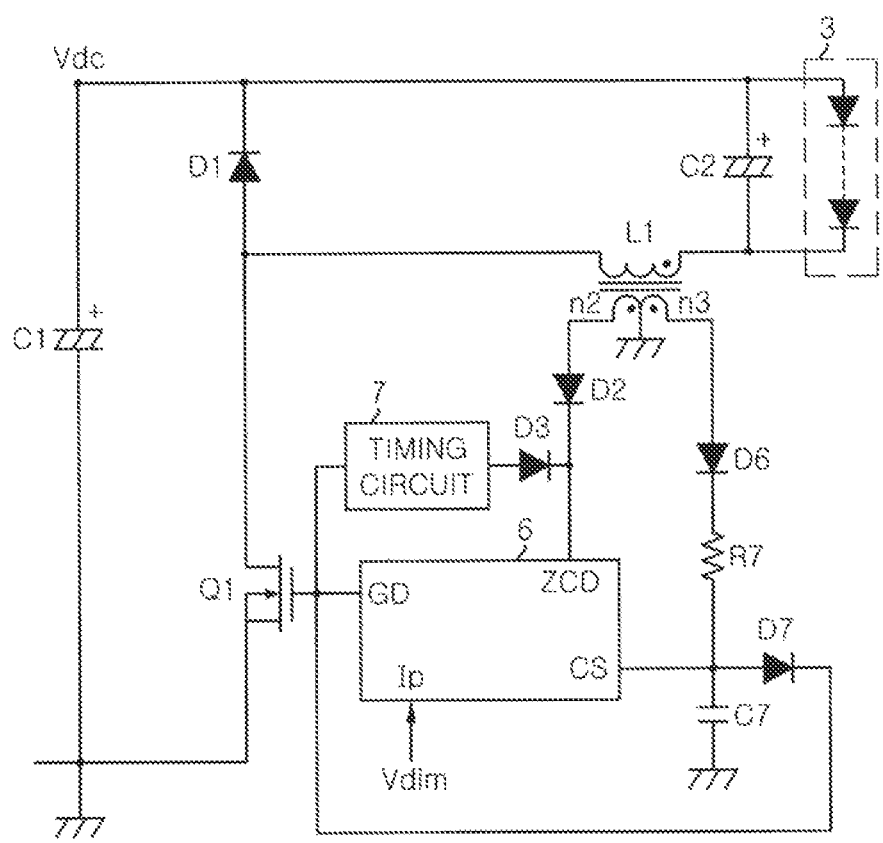
FIG. 6 is a circuit diagram of a lighting device for a solid-state light source in accordance with a fourth embodiment of the present invention.

FIG. 6 is a circuit diagram of a lighting device for a solid-state light source in accordance with a fourth embodiment of the present invention. In this embodiment, the current detection resistor R1 shown in FIG. 3 is omitted, and instead, a tertiary winding n3 is provided in the inductor L1 to perform a time integration of an output voltage of the forward side, thereby equivalently detecting the current flowing through the switching element Q1 as a voltage of a capacitor C7.

A principle thereof will now be described. When the switching element Q1 is in an ON state, $e1=L1 \cdot (di/dt)$ is established where e1 is the voltage applied to the inductor L1 and i is the current flowing through the switching element Q1.

At this time, the voltage generated in the tertiary winding n3 is $e3=(n3'/n1') \cdot e1$ where n1' is the number of turns of the primary winding n1 of the inductor L1 and n3' is the number of turns of the tertiary winding n3. When it is integrated by time t, $\int(e3) \cdot dt=(n3'/n1')L1 \cdot i+C$ is established. Here, C is an integration constant, but in case of the boundary mode as shown in FIGS. 2A and 2B or the discontinuous mode as shown in FIG. 2C, the integration constant becomes zero (C=0) because an initial value of the current i flowing through the switching element Q1 is zero. Therefore, the current i flowing through the switching element Q1 can be read by performing the time integration of the forward voltage generated in the tertiary winding n3.

Although the time integration can be accurately achieved by using a Miller integrator, in this case, the time integration is carried out by a CR integration circuit including a resistor R7 and the capacitor C7 for the sake of simplicity. A diode D6 is provided to integrate only the forward voltage generated in the tertiary winding n3, and a diode D7 is provided to initialize the capacitor C7.

The circuit operation will now be described below. When the switching element Q1 is turned on, a gradually increasing current flows through a path including the positive electrode of the capacitor C1→the capacitor C2→the inductor L1→the switching element Q1→the negative electrode of the capacitor C1. At this time, a voltage e3 proportional to the voltage applied to the inductor L1 is generated in the tertiary winding n3. By this voltage e3, the capacitor C7 is charged via the resistor R7. At this time, since the gate drive terminal GD has a high level, the diode D7 is in a cut-off state.

An increase in voltage of the capacitor C7 is monitored by the current sense terminal CS. If a detection voltage exceeds a predetermined threshold set by the peak current setting terminal Ip, the gate drive terminal GD becomes a low level, and the switching element Q1 is turned off. At this time, the capacitor C7 is discharged via the diode D7, and a time integration value of the capacitor C7 is reset.

In this embodiment, compared to the circuit shown in FIG. 3, since the current detection resistor R1 is omitted, there is an advantage of reducing the power loss caused by the current detection resistor R1. Further, even if there is a load variation or power variation, by varying the voltage applied to the inductor L1 during the ON state of the switching element Q1, the voltage e3 of the tertiary winding n3 is varied and it can be detected as a change in the rise rate of the voltage of the capacitor C7, which can substantially replace the function of the current detection resistor R1.

(Fifth Embodiment)

Figure 7:
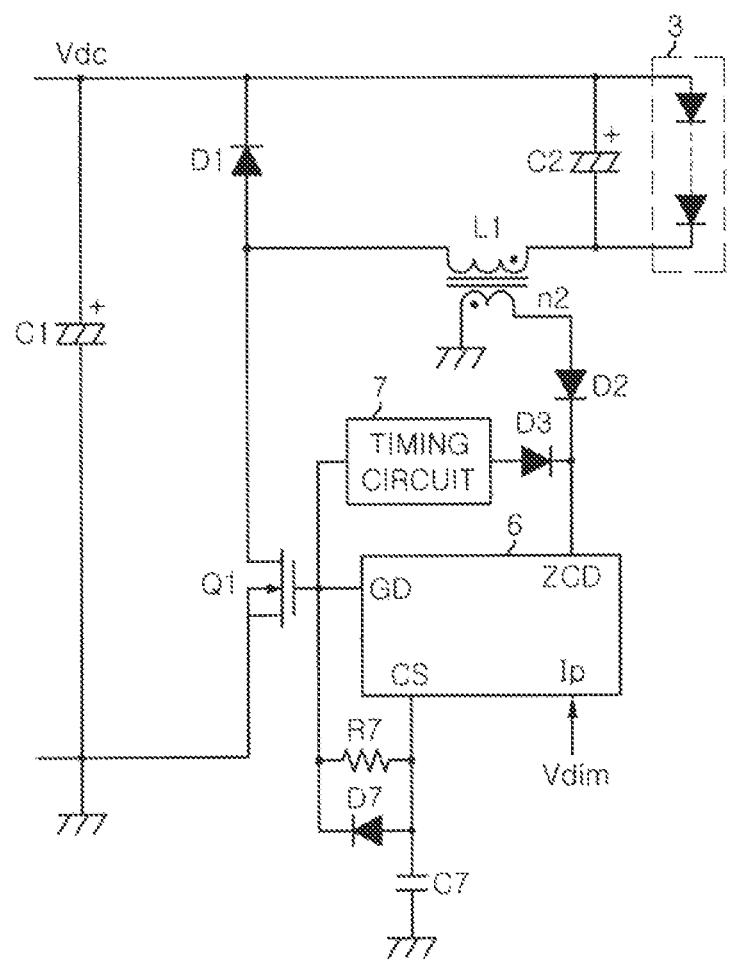
FIG. 7 is a circuit diagram of a lighting device for a solid-state light source in accordance with a fifth embodiment of the present invention.

FIG. 7 is a circuit diagram of a lighting device for a solid-state light source a fifth embodiment of the present invention. In this embodiment, the current detection resistor R1 shown in FIG. 3 is omitted, and instead, the current flowing through the switching element Q1 is detected as a quasi-voltage of the capacitor C7 by performing a time integration of the gate drive voltage outputted from the gate drive terminal GD.

Since the gate drive terminal GD has a high level when the switching element Q1 is in the ON state, the diode D7 becomes cut off, and the capacitor C7 is charged via the resistor R7.

An increase in voltage of the capacitor C7 is monitored by the current sense terminal CS. If a detection voltage exceeds a predetermined threshold set by the peak current setting terminal Ip, the gate drive terminal GD becomes a low level, and the switching element Q1 is turned off. At this time, since the gate drive terminal GD becomes a low level of low impedance, the capacitor C7 is discharged via the diode D7, and a time integration value of the capacitor C7 is reset.

In this embodiment, even if there is a load variation or power variation, these variations are not reflected in the rise rate of the voltage of the capacitor C7, but the width of the ON time of the switching element Q1 can be accurately controlled according to the dimming voltage Vdim. Further, compared to the circuit shown in FIG. 6, since it does not require the tertiary winding n3 of the inductor L1, it is possible to make the simple configuration. Furthermore, compared to the circuit shown in FIG. 3, since the current detection resistor R1 is omitted, there is an advantage of reducing the power loss caused by the current detection resistor R1.

Further, as one modification example of this embodiment, in FIG. 7, it may be configured such that an input voltage of the peak current setting terminal Ip is set to a fixed value and, instead, the externally inputted dimming voltage Vdim is superimposed on the voltage of the capacitor C7 via a predetermined current limiting resistor. In this case, even if the threshold Ip is a fixed value, the rise rate of the voltage of the capacitor C7 increases as the dimming voltage Vdim increases, so that the ON time of the switching element Q1 can be controlled to be reduced. As can be seen with reference to the circuit shown in FIG. 3, the detection voltage of the current sense terminal CS is relatively low compared to the gate drive voltage. At most, the voltage of the switching element Q1 more than the threshold voltage is a low voltage compared to the high level output of the gate drive terminal GD. Accordingly, when the switching element Q1 is in the ON state, the diode D7 is maintained in the cut-off state. Further, when the switching element Q1 is in the OFF state, the gate drive terminal GD of low impedance is at a low level. Accordingly, as described above, even though the dimming voltage Vdim has been superimposed on the voltage of the capacitor C7 via a resistor, since the diode D7 is maintained in a conducting state, charging of the capacitor C7 is started at a time when the gate drive terminal GD becomes a high level.

In the circuits shown in FIGS. 3, 6 and 7, the smoothing capacitor C2 connected in parallel to the solid-state light source 3 may be omitted, but if connected, it is possible to prevent the light of the illumination apparatus from flickering at a high frequency. This is effective, for example, after avoiding interference with the frequency of visible light communication or infrared remote control. Further, as in an LED lighting device having a power source that is separately installed, in a case where a power source unit is connected to an LED unit via a lead wire, there is an advantage of reducing high frequency radiation noise generated from the lead wire if the load current is smoothed.

Meanwhile, the smoothing capacitor C1 serving as the DC input power source Vdc is charged with a DC voltage obtained by full-wave rectifying an AC voltage supplied from, e.g., a commercial AC power source by using a full-wave rectifier (not shown). Further, a filter circuit for removing a high frequency component is generally provided at an AC input side of the full-wave rectifier. In addition, a power factor correction circuit using a step-up chopper circuit or the like may be provided between a DC output side of the full-wave rectifier and the smoothing capacitor C1.

In this configuration, as in the present embodiment, if the upper limit of the operating frequency of the switching element Q1 is limited, a filter circuit for removing a high frequency component, which is connected to the AC input side of the full-wave rectifier, can be easily designed.

(Sixth Embodiment)

Figure 8A:
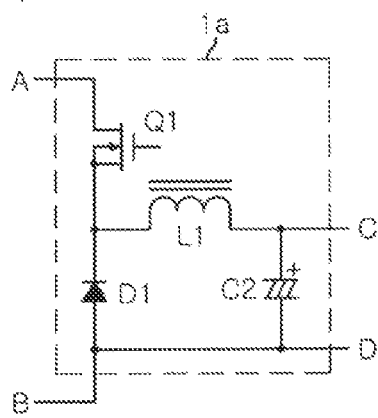
FIGS. 8A to 8D are circuit diagrams showing configuration examples of a DC power source circuit section used in the present invention.

Although the circuit examples in which the switching element Q1 of the step-down chopper circuit serving as the DC power source circuit section 1 is arranged at the low potential side have been described in the above embodiments, the present invention may be also applied to a case where the switching element Q1 of a step-down chopper circuit 1a is arranged at the high potential side as shown in FIG. 8A.

Figure 8B:
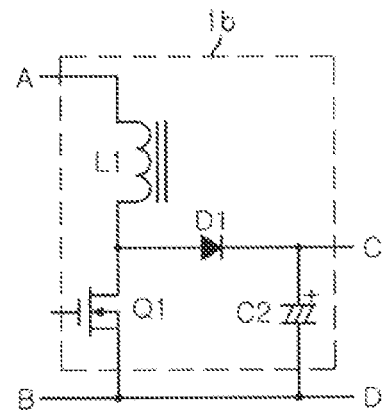
Figure 8C:
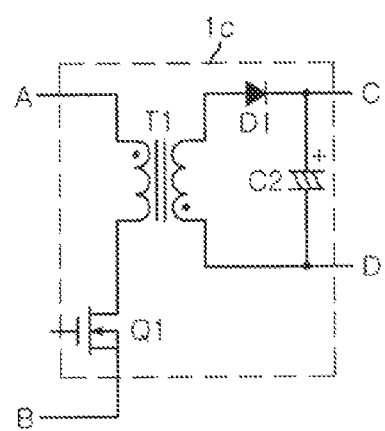
Figure 8D:
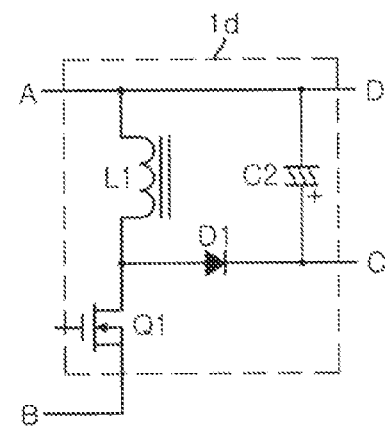

Further, various types of switching power source circuits as shown in FIGS. 8A to 8D may be used as the DC power source circuit section 1 of the present invention. FIG. 8B illustrates a step-up chopper circuit 1b, FIG. 8C illustrates a flyback converter circuit 1c, and FIG. 8D illustrates a step-up/down chopper circuit 1d.

Even in case of using any one of the switching power source circuits, there is provided a control circuit for controlling the switching element Q1 to be turned off if the current flowing through an inductive element (inductor L1 or transformer T1) during the ON state of the switching element Q1 reaches a predetermined value, or the ON time reaches a predetermined time, and controlling the switching element Q1 to be turned on if the current flowing through the inductive element during the OFF state of the switching element Q1 returns to zero, or a predetermined time counted by a timer circuit has elapsed. Accordingly, the lower limit of the OFF time or the on/off period of the switching element Q1 is fixed by the timer circuit, thereby suppressing the expansion of the switching frequency.

(Seventh Embodiment)

Although the counting time of the timer circuit 7 is constant in each embodiment, the counting time of the timer circuit 7 may be variable depending on the dimming level.

For example, all or some of resistors which determines a time constant of the timer circuit 7 may be configured as variable resistors such as light receiving elements of photo-couplers. When the dimming level is less than a predetermined level, the current of light emitting elements of the photo-couplers is controlled such that the resistance value increases as the luminance decreases (that is, as the dimming level is reduced).

In that case, the time until the switching element Q1 is turned on from the zero-crossing of the discharging current of the inductor may be changed such that the on/off frequency of the switching element Q1 decreases as the luminance decreases when the dimming level is less than a predetermined level. By controlling in this way, it is possible to perform a dimming control by lowering the on/off frequency of the switching element Q1. Thus, even when the dimming level is less than a predetermined level, the ON width of the switching element Q1 may be fixed.

Alternatively, the dimming control may be performed in combination such that the ON width of the switching element Q1 is controlled for a while to be narrow even when the dimming level is less than a predetermined level, and if the dimming level becomes less than a second predetermined level with a light flux lower than the predetermined level, the ON width of the switching element Q1 is fixed and the on/off frequency of the switching element Q1 is lowered.

(Eighth Embodiment)

Figure 9A:
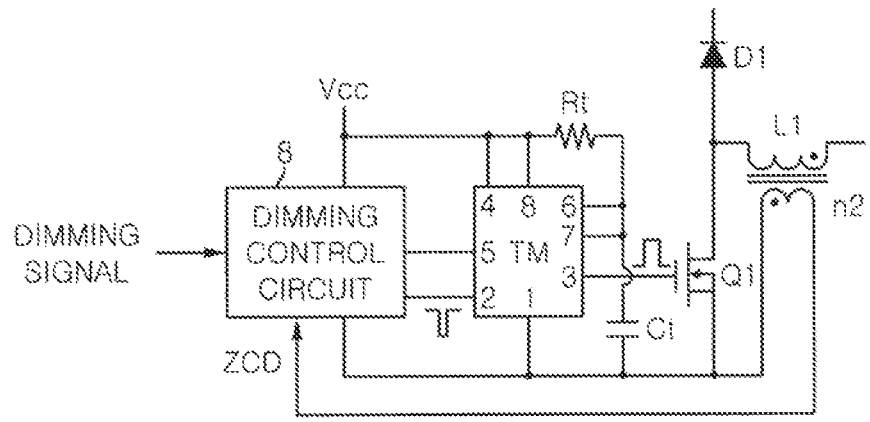
FIGS. 9A and 9B are circuit diagrams of a main part of a lighting device for a solid-state light source in accordance with an eighth embodiment of the present invention.

FIG. 9A is a circuit diagram of a main part of a lighting device for a solid-state light source in accordance with an eighth embodiment of the present invention. A configuration of a switching power source may be any one of FIGS. 7 to 8D. In this embodiment, an ON pulse width of a timer circuit TM is set to be variable based on a control voltage (reference voltage of a fifth pin), and a one-shot operation of the timer circuit TM is performed at a variable trigger timing (falling edge timing of a second pin), thereby achieving a first switching control for changing the ON width of the switching element Q1 and a second switching control for controlling an ON timing of the switching element Q1.

A dimming control circuit 8 can be implemented using, e.g., a microcomputer and may include an analog input port to receive an externally inputted dimming signal, an analog output port to control the reference voltage of the fifth pin of the timer circuit TM, a binary output port to output a falling trigger pulse of a variable timing to the second pin of the timer circuit TM, and an interrupt input port (ZCD) to detect a falling edge of an induced voltage of the secondary winding n2 of the inductor L1. If the interrupt input port (ZCD) detects the falling edge, the dimming control circuit 8 performs interrupt processing, and after counting a predetermined time ($\geq 0$), the dimming control circuit 8 outputs a falling trigger pulse to the second pin of the timer circuit TM. Generally, the falling trigger pulse can be easily generated by executing a first instruction to change the binary output port from a high level to a low level and executing a second instruction to cause the binary output port return to the high level immediately after executing the first instruction. An appropriate number of NOP instructions may be inserted between the first instruction and the second instruction. Accordingly, the falling pulse that can be triggered is outputted to the second pin of the timer circuit TM.

The timer circuit TM constitutes a one-shot multivibrator, and the output pulse width of the timer circuit TM is defined by the reference voltage of the fifth pin and a time constant of a capacitor Ct and a resistor Rt.

Figure 9B:
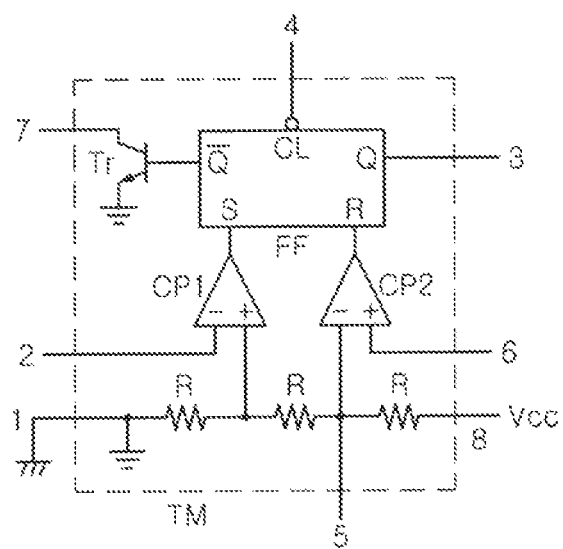

The timer circuit TM may be configured as a well-known timer IC (so-called 555) having an internal configuration as shown in FIG. 9B, but it is not limited thereto as long as it has same functionality. A first pin is a ground terminal and an eighth pin is a power source terminal.

The second pin is a trigger terminal, and if this terminal is lower than half of the voltage of the fifth pin, an internal flip-flop FF is set by an output of a first comparator CP1, so that a third pin (output terminal) becomes a high level, and a seventh pin (discharge terminal) is in an open state.

A fourth pin is a reset terminal, and if this terminal becomes a low level, the operation is in a stop state, and the third pin (output terminal) is fixed to a low level. In this embodiment, by connecting the fourth pin to the power source terminal (the eighth pin), the timer circuit TM can operate all the time, but the fourth pin may be placed under the control of the dimming control circuit 8.

The fifth pin is a control terminal, and a reference voltage, which is generally $2/3$ of the power source voltage Vcc, is applied to the fifth pin by a built-in bleeder resistor (series circuit of three resistors R). In this embodiment, the reference voltage of the fifth pin can be controlled by the dimming control circuit 8.

A sixth pin is a threshold terminal, if this terminal is higher than the voltage of the fifth pin, the internal flip-flop FF is reset by an output of a second comparator CP2, so that the third pin (output terminal) becomes a low level, and the seven pin (discharge terminal) is in a short-circuited state.

The timer circuit TM operates as a monostable multivibrator by externally attaching the resistor Rt and the capacitor Ct for setting a time constant to the timer circuit TM. If a low level pulse with a short pulse width is inputted to the second pin (trigger terminal) of the timer circuit TM, at the falling edge thereof, the third pin (output terminal) of the timer circuit TM becomes a high level, and the seventh pin (discharge terminal) is in an open state. Accordingly, the capacitor Ct is charged via the resistor Rt for setting a time constant. If the charging voltage is higher than the reference voltage (voltage of the fifth pin) compared by the second comparator CP2 of the sixth pin (threshold terminal), the third pin (output terminal) becomes a low level, and the seventh pin (discharge terminal) is short-circuited to the first pin. Accordingly, the capacitor Ct is discharged instantaneously.

Therefore, the pulse width of the high level pulse signal outputted from the third pin of the timer circuit TM is determined by the time required for charging the capacitor Ct from a ground potential up to the reference voltage (voltage of the fifth pin).

The high level pulse signal outputted from the third pin of the timer circuit TM becomes an ON drive signal of the switching element Q1. The ON time width thereof can be controlled by the voltage of the fifth pin of the timer circuit TM so that it is reduced in proportion to a reduction in the voltage of the fifth pin.

The dimming control circuit 8 varies the reference voltage of the fifth pin by reading an externally inputted dimming signal (e.g., analog voltage having a voltage level increasing as the luminance decreases) and referring to a data table stored in an internal memory according to the read value, thereby setting the ON pulse width of the switching element Q1 depending on the dimming level. Further, it sets a delay time ($\geq 0$) until the falling trigger pulse is applied to the second pin of the timer circuit TM after detecting the zero-crossing of the discharging current of the inductor L1.

PREFERRED CONTROL EXAMPLE 1

For example, the ON width of the switching element Q1 is varied to decrease as the luminance decreases (that is, as the dimming level is reduced) when the dimming level is equal to or greater than a predetermined level. If the dimming level is less than the predetermined level, the ON width of the switching element Q1 is controlled to be substantially the same as the ON width at the predetermined level. Further, the delay time until the falling trigger pulse is applied to the second pin of the timer circuit TM after detecting the zero-crossing of the discharging current of the inductor L1 is controlled to be substantially the same (e.g., zero) as the time when the dimming level is equal to or greater than the predetermined level, so that the operation is performed in the boundary mode or the discontinuous mode close to the boundary mode. Further, when the dimming level is less than the predetermined level, the time until the switching element Q1 is turned on from the zero-crossing of the discharging current is controlled to gradually increase such that the on/off frequency of the switching element Q1 decreases from a frequency at the predetermined level. By controlling in this way, even if there is a limit to controlling the lower limit of the ON width of the switching element Q1, dimming can be performed to further reduce the luminance.

PREFERRED CONTROL EXAMPLE 2

Further, as a more preferred control example, the control is performed as in the control Example 1 when the dimming level is equal to or greater than the predetermined level, and when the dimming level is less than the predetermined level, while controlling the ON width of the switching element Q1 to decrease as the luminance decreases (that is, as the dimming level is reduced), the time until the switching element Q1 is turned on from the zero-crossing of the discharging current of the inductor L1 is varied such that the on/off frequency of the switching element Q1 is substantially the same as the frequency at the predetermined level. Further, if the dimming level becomes less than a second predetermined level with a light flux lower than the predetermined level, while controlling the ON width of the switching element Q1 to be substantially the same as the ON width at the second predetermined level, the delay time until the falling trigger pulse is applied to the second pin of the timer circuit TM after detecting the zero-crossing of the discharging current of the inductor L1 is controlled such that the on/off frequency of the switching element Q1 decreases from the frequency at the second predetermined level. By controlling in this way, even if there is a limit to controlling the lower limit of the ON width of the switching element Q1, dimming can be performed to further reduce the luminance. Also, even when dimming is performed at a low luminance, it is possible to control such that the on/off frequency of the switching element Q1 does not change as much as possible.

In this embodiment, the dimming control circuit 8 is configured as a microcomputer, but it may be configured using an analog circuit if it is possible to achieve the same functionality.

In each of the above-described embodiments, a MOSFET has been illustrated as the switching element Q1, but it is not limited thereto, and for example, an insulated gate bipolar transistor (IGBT) may be used.

Figure 11:
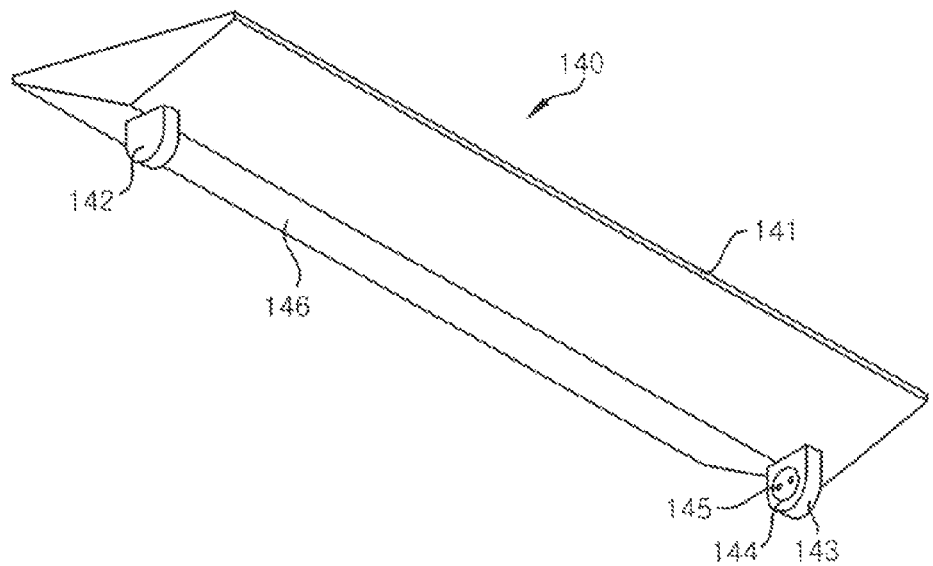
FIG. 11 illustrates a configuration of an illumination apparatus in accordance with an embodiment of the present invention.

The lighting device of each of the first to the eighth embodiments may be used in, e.g., a straight pipe type LED illumination apparatus 140 shown in FIG. 11. The straight pipe type LED illumination apparatus 140 shown in FIG. 11 is an illumination apparatus having one lamp.

As illustrated in FIG. 11, the LED illumination apparatus 140 includes an apparatus main body 141 in which the lighting device is installed, a pair of sockets 142 and 143 having lamp pin contact holes 145 through which the straight pipe type LED is attached to both ends of the apparatus main body 141 and a spring 144, and a reflection plate 146.

When the lighting device of each of the first to the eighth embodiments is applied to the illumination apparatus 140 shown in FIG. 11, the same effect as that of the above embodiment can be obtained.

Further, the lighting device of each of the first to the eights embodiments may be applied to an apparatus having two or more lamps.

Further, various shapes of LEDs may be used instead of straight pipe type LEDs used in a shop or a facility.

The lighting device of the present invention may be used as a variety of light sources, e.g., a backlight of a liquid crystal display or a light source of a projector without being limited to the illumination apparatus.

In the description of the above embodiments, the light emitting diode has been illustrated as the solid-state light source 3, but it is not limited thereto. For example, an organic electroluminescent (EL) element, semiconductor laser element or the like may be used.

While the invention has been shown and described with respect to the embodiments, it will be understood by those skilled in the art that various changes and modification may be made without departing from the scope of the invention as defined in the following claims.

What is claimed is:

1. A lighting device for a solid-state light source, comprising:
   a DC power source circuit section which performs power conversion of a power of a DC input power source by using an inductor connected in series to a switching element, and flows a current in a solid-state light source by using a charging/discharging current or either one of charging and discharging currents of the inductor; and
   a current control section which controls the switching element to control a current flowing through the solid-state light source for controlling a dimming level of the solid-state light source,
   wherein the current control section includes a first switching control unit for changing an ON width of the switching element depending on the dimming level; and a second switching control unit for controlling an ON timing of the switching element, and
   wherein the second switching control unit changes a time until the switching element is turned on from a zero-crossing of the discharging current of the inductor such that the time becomes substantially the same when the dimming level is equal to or greater than a predetermined level, and the time becomes longer when the dimming level is less than the predetermined level, thereby limiting a range of an on/off frequency of the switching element.

2. The lighting device of claim 1, wherein while the first switching control unit changes the ON width of the switching element to be reduced as the dimming level is reduced, the second switching control unit changes the time until the switching element is turned on from the zero-crossing of the discharging current of the inductor such that the time becomes substantially the same when the dimming level is equal to or greater than the predetermined level, and the time becomes longer, thereby making the on/off frequency of the switching element substantially the same as a frequency at the predetermined level when the dimming level is less than the predetermined level.

3. The lighting device of claim 1, wherein while the first switching control unit changes the ON width of the switching element to be reduced as the dimming level is reduced when the dimming level is equal to or greater than the predetermined level and controls the ON width of the switching element to be substantially the same as an ON width at the predetermined level when the dimming level is less than the predetermined level, the second switching control unit changes the time until the switching element is turned on from the zero-crossing of the discharging current of the inductor such that the time becomes substantially the same when the dimming level is equal to or greater than the predetermined level, and the time becomes longer, thereby making the on/off frequency of the switching element decrease from a frequency at the predetermined level when the dimming level is less than the predetermined level.

4. The lighting device of claim 1, wherein while the first switching control unit changes the ON width of the switching element to be reduced as the dimming level is reduced, the second switching control unit changes the time until the switching element is turned on from the zero-crossing of the discharging current of the inductor such that the time becomes substantially the same when the dimming level is equal to or greater than the predetermined level, and the time becomes longer, thereby making the on/off frequency of the switching element substantially the same as a frequency at the predetermined level when the dimming level is less than the predetermined level, and
   wherein if the dimming level becomes less than an additional predetermined level with a light flux lower than the predetermined level, while the first switching control unit controls the ON width of the switching element to be substantially the same as an ON width at the additional predetermined level, the second switching control unit changes the time until the switching element is turned on from the zero-crossing of the discharging current of the inductor such that the time becomes longer, thereby making the on/off frequency of the switching element decrease from a frequency at the additional predetermined level.

5. The lighting device of claim 1, wherein the second switching control unit controls the time until the switching element is turned on from the zero-crossing of the discharging current of the inductor to be almost zero when the dimming level is equal to or greater than the predetermined level.

6. An illumination apparatus comprising the lighting device for the solid-state light source described in claim 1.

* * * * *